US008503038B2

(12) United States Patent
Mastie

(10) Patent No.: US 8,503,038 B2
(45) Date of Patent: Aug. 6, 2013

(54) MEDIA ADVANCE WITH VOIDING OF SENSITIVE SUBSTRATES

(75) Inventor: Scott D. Mastie, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 542 days.

(21) Appl. No.: 12/789,266

(22) Filed: May 27, 2010

(65) Prior Publication Data

US 2011/0293345 A1 Dec. 1, 2011

(51) Int. Cl.
*H04N 1/40* (2006.01)

(52) U.S. Cl.
USPC .......................................................... 358/3.28

(58) Field of Classification Search
USPC ......... 358/3.28, 1.13, 1.1, 1.9, 1.15; 235/492, 235/488, 380, 494; 400/621
See application file for complete search history.

(56) References Cited

U.S. PATENT DOCUMENTS 6,324,353 B1 11/2001 Laussermair et al.
7,400,420 B2 * 7/2008 Kageyama et al. .......... 358/1.13
2003/0234949 A1 12/2003 Kageyama et al.
2005/0067497 A1 * 3/2005 Jones et al. .................. 235/492
2006/0115313 A1 * 6/2006 Shaw, III ...................... 400/621
2008/0037048 A1 2/2008 Hopper et al.
2009/0279143 A1 11/2009 St. Jaques et al.
2009/0284782 A1 11/2009 Muraka
2010/0321738 A1 * 12/2010 Wu et al. ...................... 358/3.28

FOREIGN PATENT DOCUMENTS

JP 2000158758 6/2000

* cited by examiner

*Primary Examiner* — Charlotte M Baker
(74) *Attorney, Agent, or Firm* — Duft Bornsen & Fettig, LLP

(57) ABSTRACT

Methods and systems herein provide for securely advancing continuous form media including pre-printed sensitive elements. A command is identified for advancing the media without imprinting on the sensitive elements. A security image is identified for voiding the sensitive elements. The security image is then imprinted on the sensitive elements as the media is advanced to void the sensitive elements. Embodiments include detecting a Non Process Run Out (NPRO) command at a printer for advancing the media without imprinting the sensitive elements, and imprinting the security image onto the sensitive elements as the media is advanced to void the sensitive elements. Further embodiments include detecting that a print job includes a blank logical page for advancing the media without imprinting the sensitive elements, and imprinting the security image onto the sensitive elements as the media is advanced to void the sensitive elements.

31 Claims, 12 Drawing Sheets

MEDIA ADVANCE WITH VOIDING OF SENSITIVE SUBSTRATES

FIELD OF THE INVENTION

The invention relates to the field of production printing systems and, in particular, to voiding continuous form media on a printing system when the media is advanced and the media is of a sensitive nature.

BACKGROUND

Production printing systems utilizing continuous form media typically include a number of post printing stations, through which the continuous form media flows. Such stations may include a cutting station, a folding station, a stapling station, etc. Due to the size and the complexity of the printing system, a large linear media path may exist from the exit of the actual imprinting on the media to the post printing stations. For example, the distance the media may have to travel from the imprinting station to the next station, such as a cutting station, may be as much as 20 or more linear feet. In some cases, the media is advanced at the end of the imprinting process to feed the continuous form paper to the next station. In this case, a large amount of media may travel un-printed at the exit of the imprinting station.

Unlike typical paper, some continuous form media is of a more sensitive nature. For example, the continuous form media may include pre-printed check blanks, government identity cards, insurance cards, etc. When advancing such media at the end of the imprinting station to the post printing stations, a large amount of such sensitive media may remain un-printed upon, and subsequently, pose potential accountability and security problems.

SUMMARY

Embodiments described herein provide systems and methods for securely advancing continuous form media including pre-printed sensitive elements. A command is detected for advancing the media without imprinting on the sensitive elements. A security image is identified for voiding the sensitive elements. The security image is then imprinted on the sensitive elements as the media is advanced to void the sensitive elements.

In one embodiment, a printer comprising a print engine and a print controller is disclosed. The print engine is operable to print onto a continuous form media including pre-printed sensitive elements for imprinting. The print controller is operable to detect a command for advancing the media without imprinting on the sensitive elements, to identify a security image for voiding the sensitive elements, and to imprint the security image onto the sensitive elements as the media is advanced to void the sensitive elements.

In another embodiment, a method operable on a printer using continuous form media is disclosed. The media includes pre-printed sensitive elements for imprinting. According to the method, a command is detected at the printer for advancing the media without imprinting on the sensitive elements. A security image is identified for voiding the sensitive elements. The security image is imprinted onto the sensitive elements as the media is advanced to void the sensitive elements.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
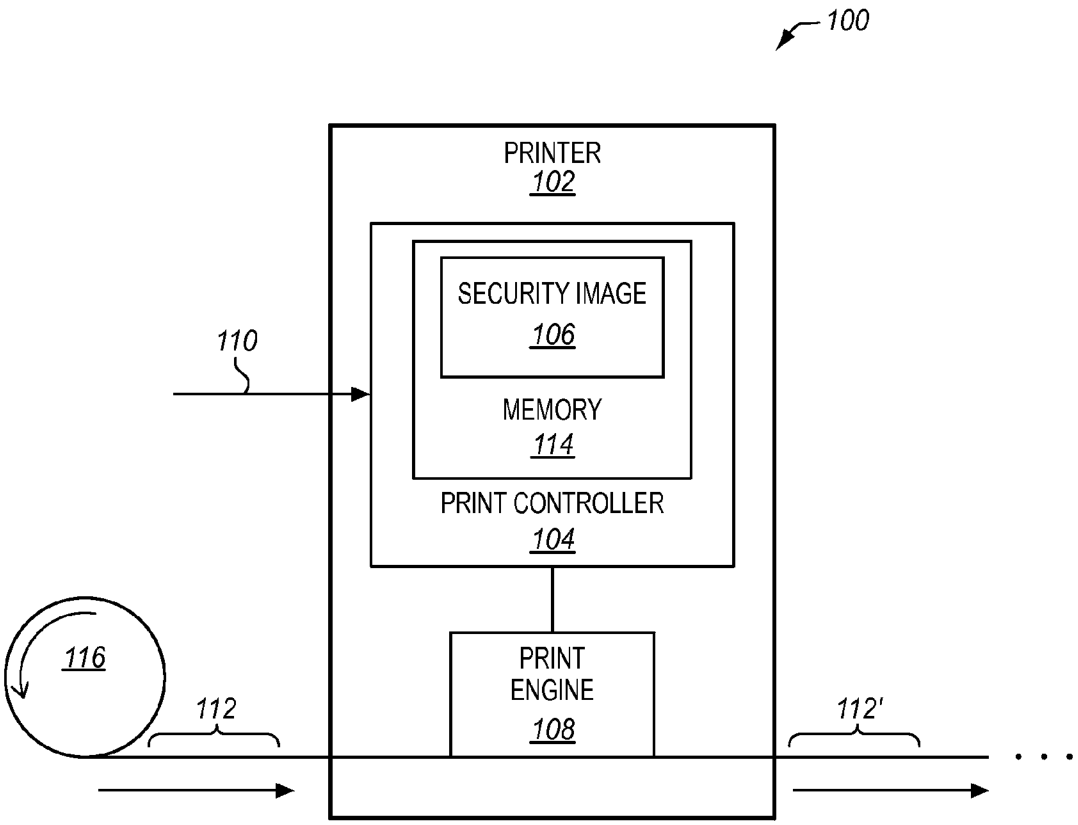
FIG. 1 is a block diagram illustrating a printing system for securely advancing continuous form media in an exemplary embodiment.

FIG. 1 is a block diagram illustrating a printing system 100 for securely advancing continuous form media in an exemplary embodiment. System 100 includes a printer 102 and a continuous form media 116 for imprinting by printer 102. Printer 102 includes a print engine 108. Print engine 108 comprises any device, component, or system operable to print onto media 116. In FIG. 1, media 116 includes pre-printed sensitive elements in a continuous form. Generally, these types of media are included in a class of stock known as 'sensitive substrates'. Sensitive substrates generally are accounted for during the printing process because the pre-printed elements on the media may have an intrinsic value. For example, the sensitive elements may include checks, identity cards, bonds, etc. Thus, advancing media 116 without imprinting on the sensitive elements may be problematic, due to the intrinsic value of the sensitive elements. Generally, printer 102 is operable to imprint security images onto the sensitive elements as media 116 is advanced to void the sensitive elements. FIG. 1 illustrates two sections of the sensitive elements pre-printed on media 116. The first section of media 116 is a pre-fed section 112, which is located between the roll of media 116 and the printer 102. Section 112 includes pre-printed sensitive elements which are being fed to printer 102 for imprinting or advancement by printer 102. The second section of media 116 is a post-fed section 112', which is located on a section of media 116 which has exited printer 102. Section 112' may be an imprinted version of section 112 after being fed through printer 102, or may be an equivalent section of media 116 after imprinting by printer 102. Further, media 116 may be advanced along a direction indicated by the arrows in FIG. 1 to one or more post-printing stations for cutting, folding, stapling, etc.

Printer 102 also includes a print controller 104. Print controller 104 includes a memory 114 operable to store a security image 106. Print controller 104 generally receives print data 110 including information for imprinting on media 116, and rasterizes print data 110 in color and/or in black and white for use by print engine 108 when imprinting the information onto media 116. In FIG. 1, print controller 104 has been enhanced to identify commands for advancing media 116 without imprinting on the sensitive elements, to identify security images, and to direct print engine 108 to imprint the security images onto the sensitive elements. For example, media 116 may contain pre-printed checks. Thus, if media 116 were advanced without imprinting (e.g., imprinting with payee information on the checks), then such non-imprinted checks may be subjected to a problematic hand cancellation and accounting process to prevent an unauthorized use.

Figure 2:
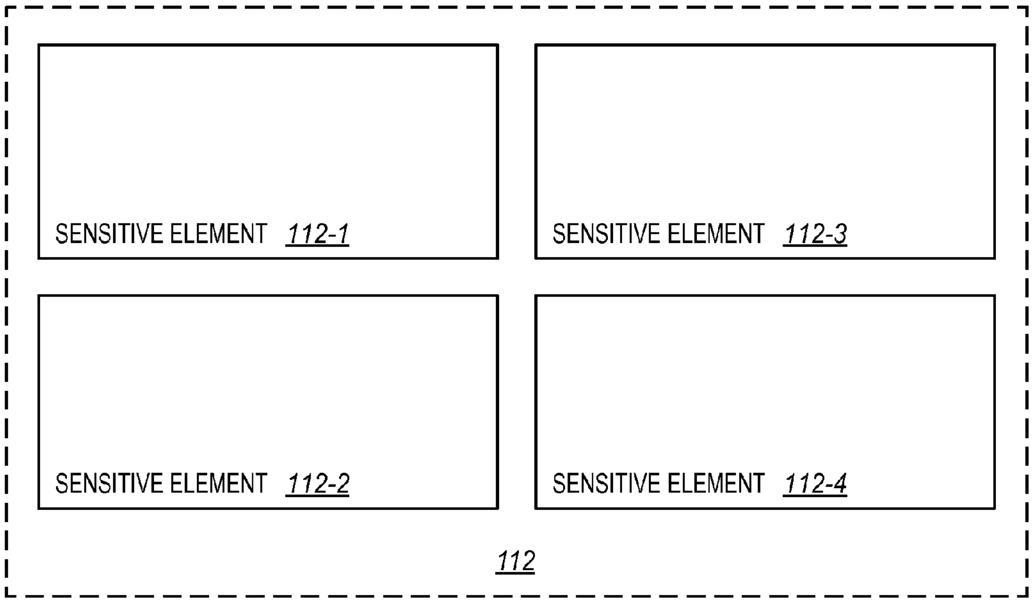
FIG. 2 illustrates pre-printed sensitive elements on a continuous form media in an exemplary embodiment.

FIG. 2 illustrates an example of section 112 of media 116 which includes a number of sensitive elements 112-1 to 112-4 for imprinting by printer 102. Section 112 illustrates a 4-up layout for sensitive elements 112-1 to 112-4 for imprinting, although other layouts and orientations for sensitive elements 112-1 to 112-4 may exist. In FIG. 2, section 112 represents a linear section of media 116 for imprinting by printer 102, and subsequently, processing by a number of post printing stations. For example, after imprinting sensitive elements 112-1 to 112-4, a cutting station may cut media 116 to parse out sensitive elements 112-1 to 112-4.

Figure 3:
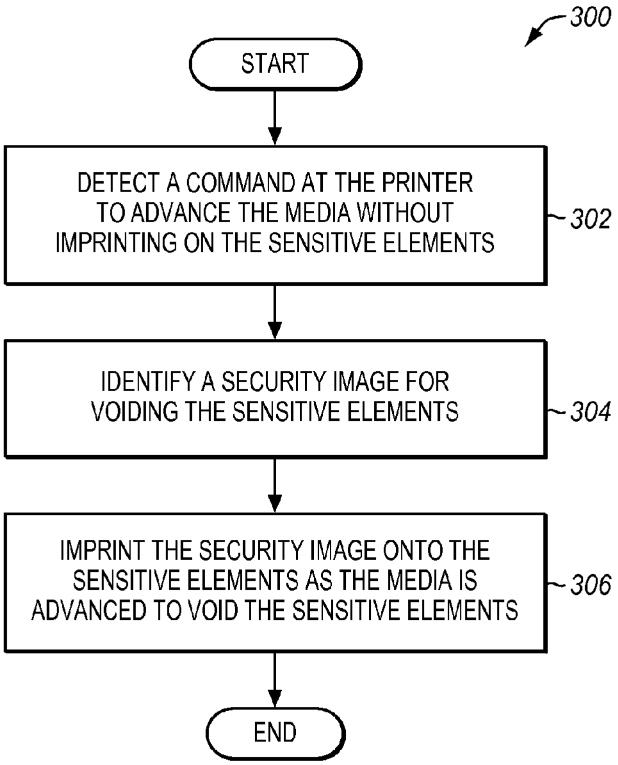
FIG. 3 is a flow chart illustrating a method of securely advancing sensitive media in an exemplary embodiment.

FIG. 3 is a flow chart illustrating a method 300 of securely advancing media 116 in response to detecting a command to advance media 116 in an exemplary embodiment. The steps of method 300 will be described with respect to system 100 of FIG. 1, although one skilled in the art will recognize that method 300 may be performed by other systems not shown. In addition, the steps of the flow charts shown herein are not all inclusive and other steps, not shown, may be included. Further, the steps may be performed in an alternate order.

In step 302, print controller 104 detects a command at printer 102 to advance media 116 without imprinting on sensitive elements 112-1 to 112-4 (See FIGS. 1-2). One skilled in the art will recognize that a number of possible commands may be detected by print controller 104 for advancing media 116 without imprinting on sensitive elements 112-1 to 112-4. For example, media feed commands, Non Process Run Out (NPRO) commands, etc. may be detected. In addition, blank pages within print data 110 may also detected by printer 102, where such blank pages (or partially blank pages) may potentially result in one or more sensitive elements 112-1 to 112-4 being advanced without imprinting. As discussed previously, advancing media 116 without imprinting on sensitive elements 112-1 to 112-4 may be problematic, due to an intrinsic value associated with sensitive elements 112-1 to 112-4 and/or media 116.

In step 304, print controller 104 identifies a security image 106 for voiding sensitive elements 112-1 to 112-4. Security image 106 may include graphical features, text, or a combination of graphical features and text for rendering sensitive elements 112-1 to 112-4 void after imprinting security image 106. For example, security image 106 may include readable text depicting "cancelled", "void", "non-negotiable", or some other information clearly identifying that sensitive elements 112-1 to 112-4 as being invalid, null, having no legal or binding force, etc. Additionally, security image 106 may include, either alone or in combination with the aforesaid readable text, a pantograph, which is an image that is not visible in the original printed document, but which becomes visible in copies of the original document. When identifying security image 106, print controller 104 may query a lookup table to identify one or more security images associated with media 116. For example, when media 116 is loaded onto printer 102, an operator may select security image 106 from a plurality of security images for voiding sensitive elements 112-1 to 112-4. Further, security image 106 may be pre-programmed within printer 102 for voiding sensitive elements 112-1 to 112-4.

Figure 4:
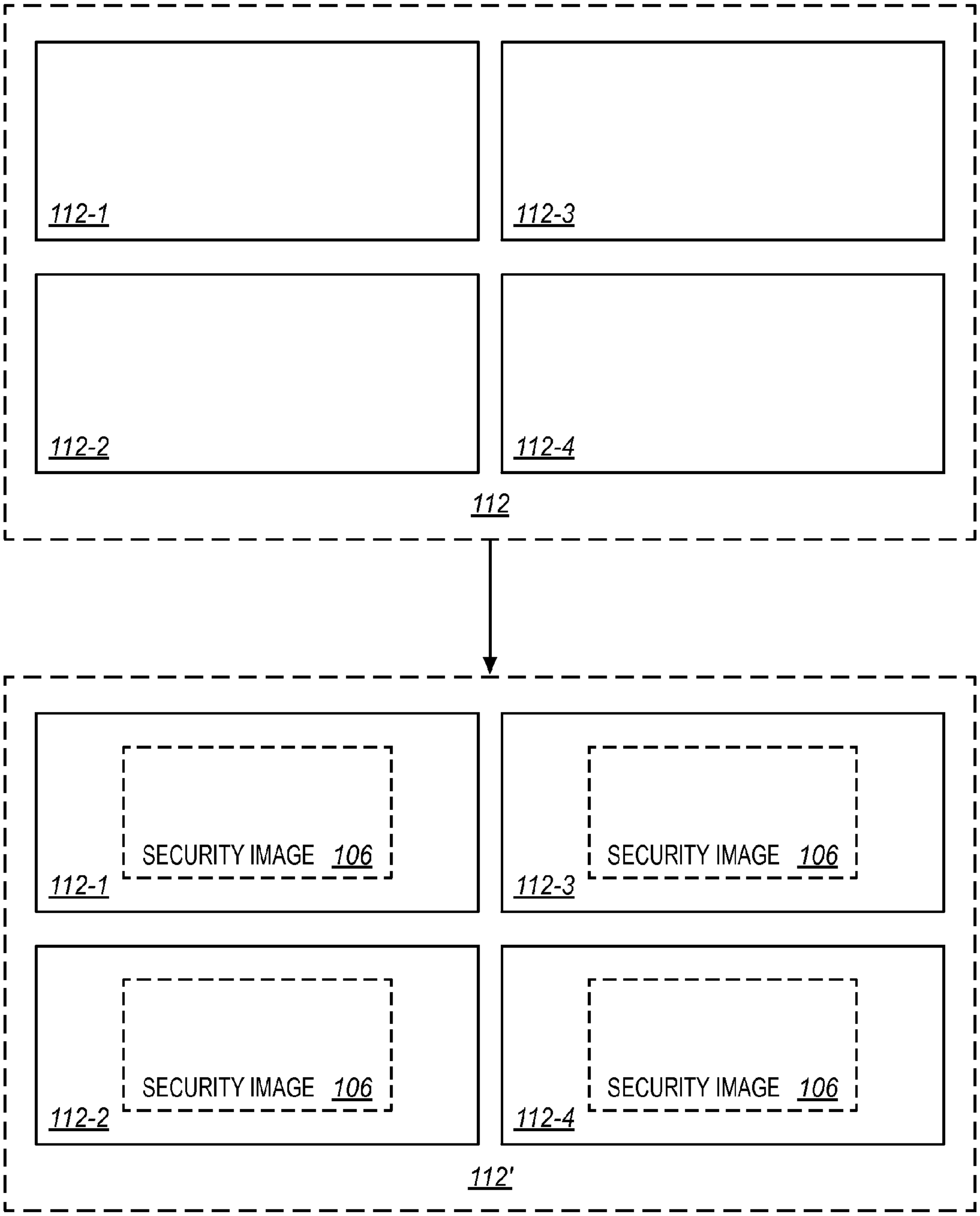
FIG. 4 illustrates the result of imprinting a security image onto the sensitive elements of FIG. 2 in an exemplary embodiment.

In step 306, print controller 104 directs print engine 108 to imprint security image 106 onto sensitive elements 112-1 to 112-4 as media 116 is advanced to void sensitive elements 112-1 to 112-4. FIG. 4 illustrates the result of imprinting security image 106 onto sensitive elements 112-1 to 112-4 in an exemplary embodiment. FIG. 4 illustrates section 112 of media 116 before imprinting, and section 112' of media 116 after security image 106 is imprinted onto sensitive elements 112-1 to 112-4. After imprinting security image 106 onto sensitive elements 112-1 to 112-4 as shown in FIG. 4, each of sensitive elements 112-1 to 112-4 are rendered void. When voided, media 116 and/or sensitive elements 112-1 to 112-4 may have little or no intrinsic value remaining, thus solving problems associated with advancing media 116 without imprinting. In some embodiments, an imaging system may capture an image of voided sensitive elements 112-1 to 112-4 for verification of the application of security image 106 onto sensitive elements 112-1 to 112-4. Further, the specific application of security image 106 within section 112' is not limited to those shown explicitly in the example of FIG. 4. Further still, although the same security image 106 is shown imprinted on each of the sensitive elements 112-1 to 112-4, one skilled in the art will recognize that different security images may be imprinted on different sensitive elements 112-1 to 112-4 as a matter of implementation choice.

Figure 5:
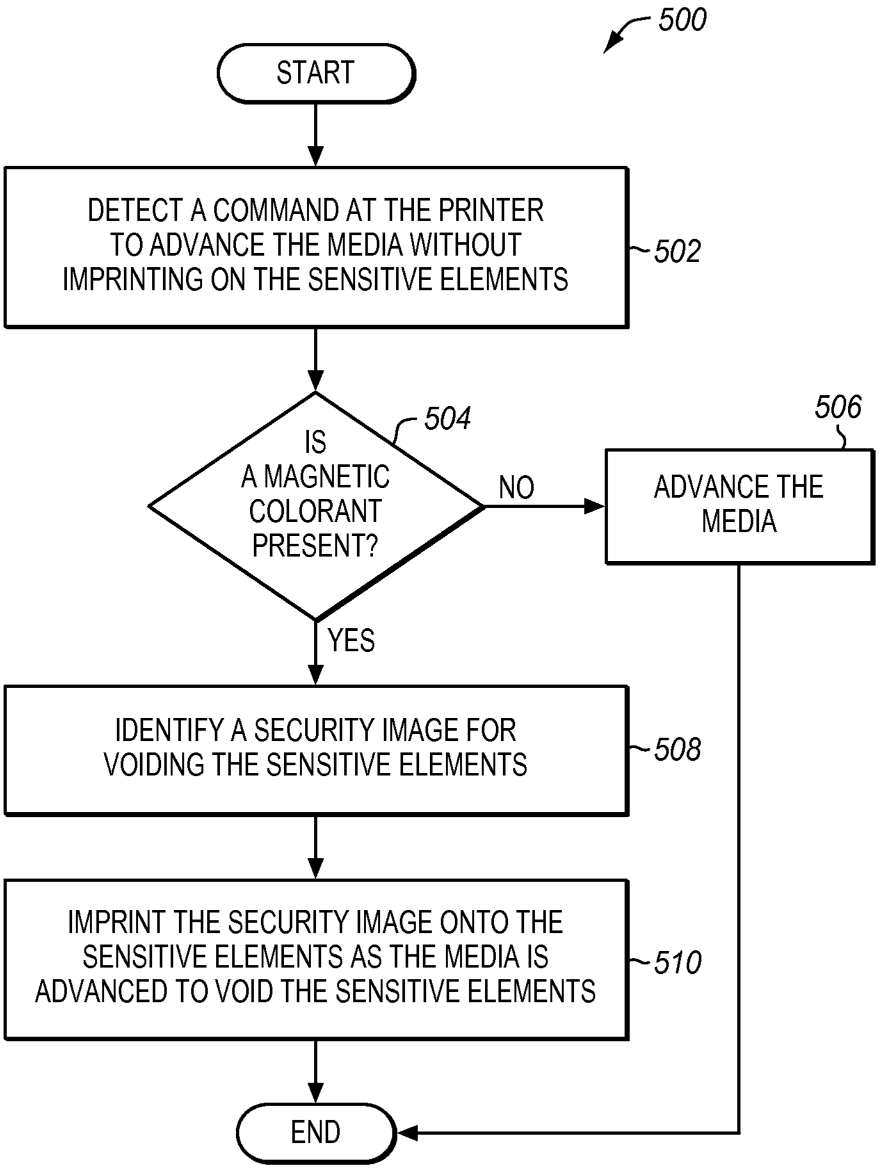
FIG. 5 is a flow chart illustrating a method of securely advancing sensitive media when a magnetic colorant is present in an exemplary embodiment.

FIG. 5 is a flow chart illustrating a method 500 of securely advancing sensitive media when a magnetic colorant is present in printer 102 in an exemplary embodiment. The steps of method 500 will be described with respect to system 100 of FIG. 1, although one skilled in the art will recognize that method 500 may be performed by other systems not shown.

In step 502, print controller 104 detects a command at printer 102 to advance media 116 without imprinting onto sensitive elements 112-1 to 112-4. In one embodiment, detecting the command comprises detecting a Non Process Run Out (NPRO) command. A NPRO command is known to one skilled in the art for advancing media 116 without imprinting. One example of a NPRO command is a form feed button on a continuous form desktop printer, or a NPRO button or touchscreen input on a production printing system. For example, an operator may utilize user interface (not shown) to generate the NPRO command when initially loading media 116 into printer 102. Further, an operator may utilize the user interface to generate the NPRO command when feeding post-printing stations (not shown) which are down-media from printer 102. Further still, a NPRO command may be initiated by an operator in response to printer 102 finishing a print job which has yet to be stacked or pushed to post-printing stations down-media from printer 102. Regardless, generating a NPRO command at printer 102 is potentially problematic as the NPRO command on a typical printer will advance media 116 without imprinting on sensitive elements 112-1 to 112-4.

In another embodiment, detecting the command comprises detecting a blank logical page within a print job for advancing media 116 without imprinting onto sensitive elements 112-1 to 112-4. For example, a host system (not shown) may generate a print job and subsequently forward the print job as print data 110 to printer 102. Print data 110 may include Page Description Language (PDL) data, such as PostScript data, PDF (Portable Document Format) data, Intelligent Printer Data Stream (IPDS) data, Advanced Function Presentation (AFP) data, Mixed Object: Document Content Architecture (MODCA) data, or other types of PDL data which is received by a print controller 104 and rasterized to convert print data 110 into bitmap data for print engine 108. Such print data 110 may contain blank logical pages which, when processed by printer 102, may result in blank portions of media 116 being advanced. Therefore, when print controller 104 receives the print job including the blank logical page for advancing media 116 without imprinting on sensitive elements 112-1 to 112-4, print controller 104 directs the imprinting of security image 106 onto sensitive elements 112-1 to 112-4.

In step 504, print controller 104 determines if a magnetic colorant (e.g., a magnetic ink, a magnetic toner which may be utilized by a Magnetic Ink Character Recognition (MICR) process) is present (i.e., loaded) at printer 102. In some cases, printer 102 uses magnetic colorants when imprinting onto media 116. When media 116 is imprinted with a magnetic colorant, specialized equipment may be used to read the imprinted information by reading the magnetic colorants. For example, a bank may use a magnetic check reader for automatically processing checks. If no magnetic colorant is detected by print controller 104, then step 506 is performed. If a magnetic colorant is detected by print controller 104, then step 508 is performed. Steps 508 and 510 of identifying security image 106 and imprinting the security image 106 have been previously described with respect to method 300 of FIG. 3.

Figure 6:
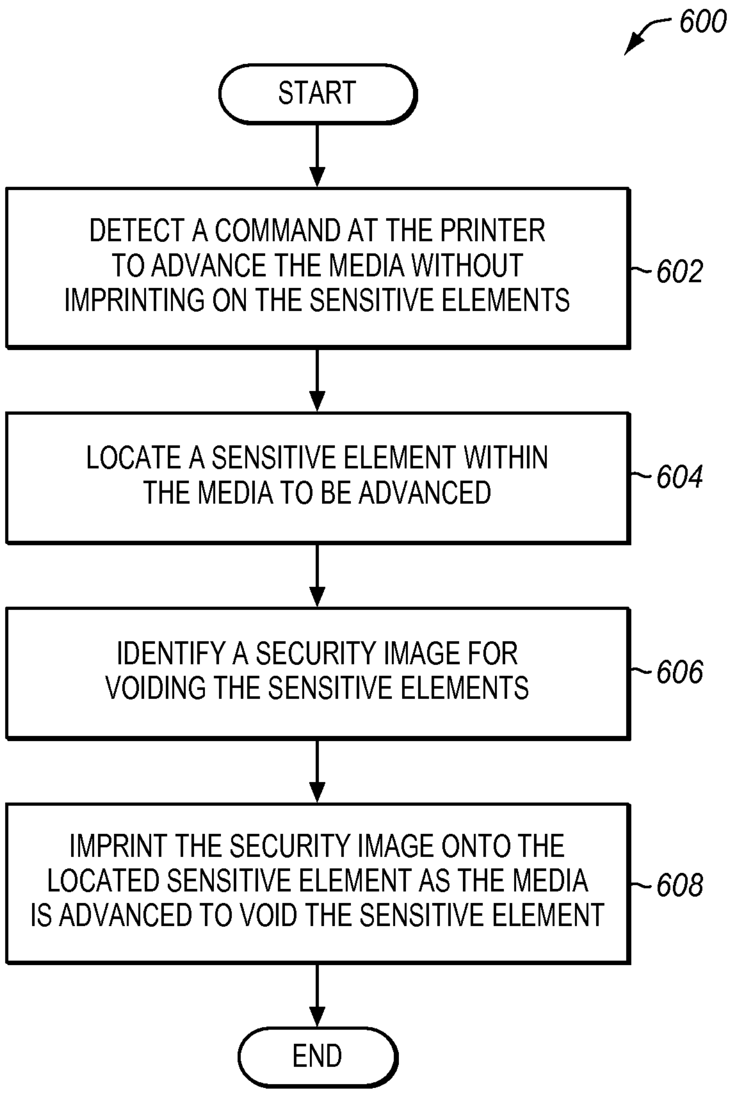
FIG. 6 is a flow chart illustrating a method of locating a sensitive element and securely advancing continuous form media in an exemplary embodiment.

FIG. 6 is a flow chart illustrating a method 600 of locating sensitive elements and securely advancing sensitive media in an exemplary embodiment. The steps of method 600 will be described with respect to system 100 of FIG. 1, although one skilled in the art will recognize that method 600 may be performed by other systems not shown. In FIG. 6, step 604 has been added for locating sensitive elements within the media to be advanced. Generally, steps 602 and 606 are performed in a similar manner as described with respect to methods 300 and 500.

In step 604 of method 600, print controller 104 locates a sensitive element 112-1 to 112-4 within media 116 to be advanced. For example, print controller 104 may locate sensitive element 112-1 within section 112 (See FIG. 2) for imprinting. Also, print controller 104 may locate specific portions within sensitive element 112-1 for imprinting. In some cases, it may be desirable to imprint security image 106 on different portions of sensitive element 112-1, such as when security image 106 may obscure important features of sensitive element 112-1. Further, it may be desirable to imprint security image 106 onto one or more sensitive elements 112-1 to 112-4 which have not be previously imprinted with print data 110 by print engine 108. Thus, print controller 104 may first identify one or more sensitive elements 112-1 to 112-4 which include data imprinted by print engine 108. After identifying, print controller 104 may avoid printing security image 106 onto those elements.

In step 608, print controller 104 imprints security image 106 onto the located sensitive element as the media is advanced.

Figure 7:
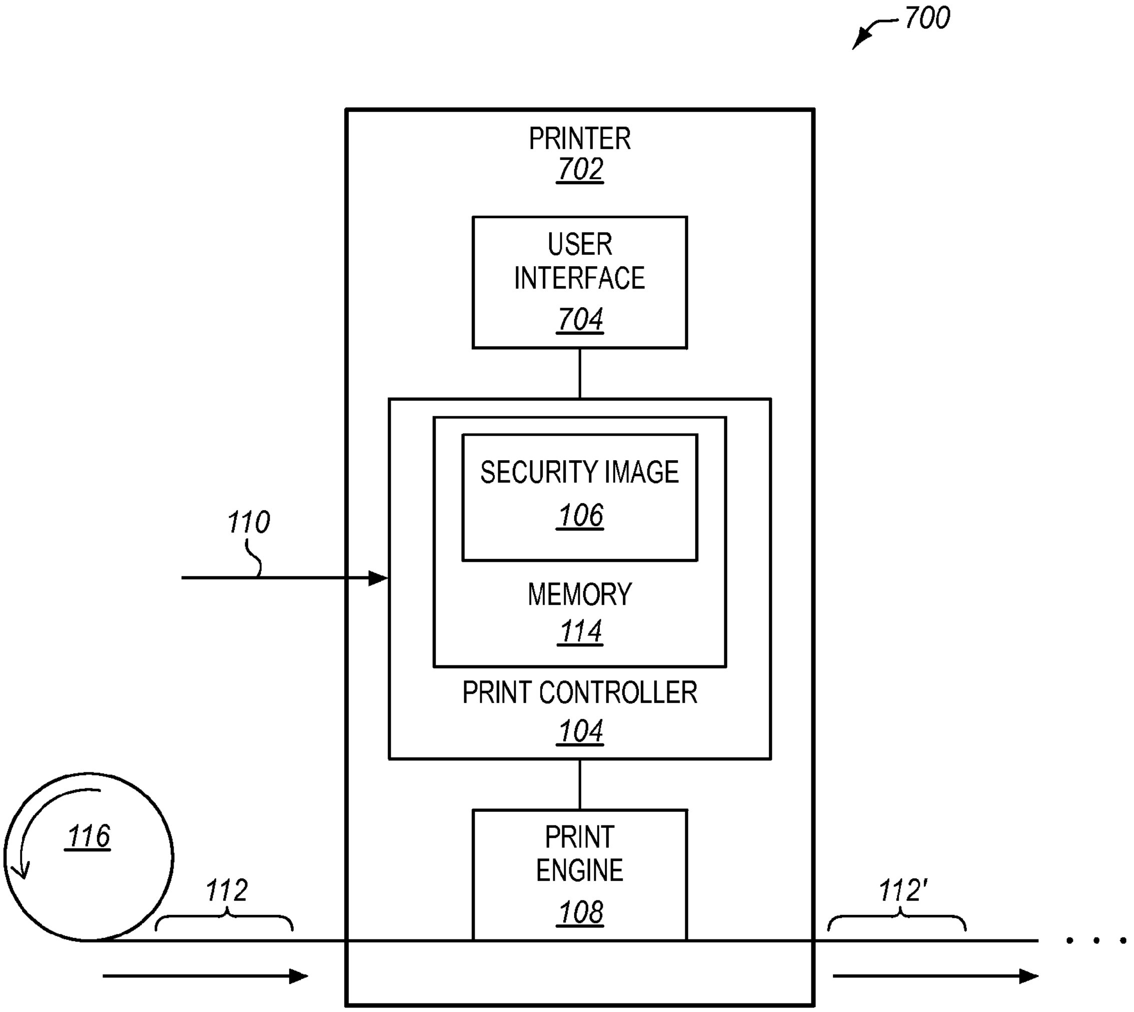
FIG. 7 is a block diagram illustrating another printing system for securely advancing continuous form media in an exemplary embodiment.

FIG. 7 is a block diagram illustrating another printing system 700 for securely advancing continuous form media in an exemplary embodiment. System 700 includes a printer 702 and continuous form media 116 for imprinting by printer 702. Printer 702 includes a user interface 704 generally operable to allow an operator (not shown) to generate commands for controlling printer 702. User interface 704 may include one or more buttons or touch screen interfaces to generate commands for controlling printer 702. For example, user interface 704 may generate NPRO commands for advancing media 116 through printer 702.

Figure 8:
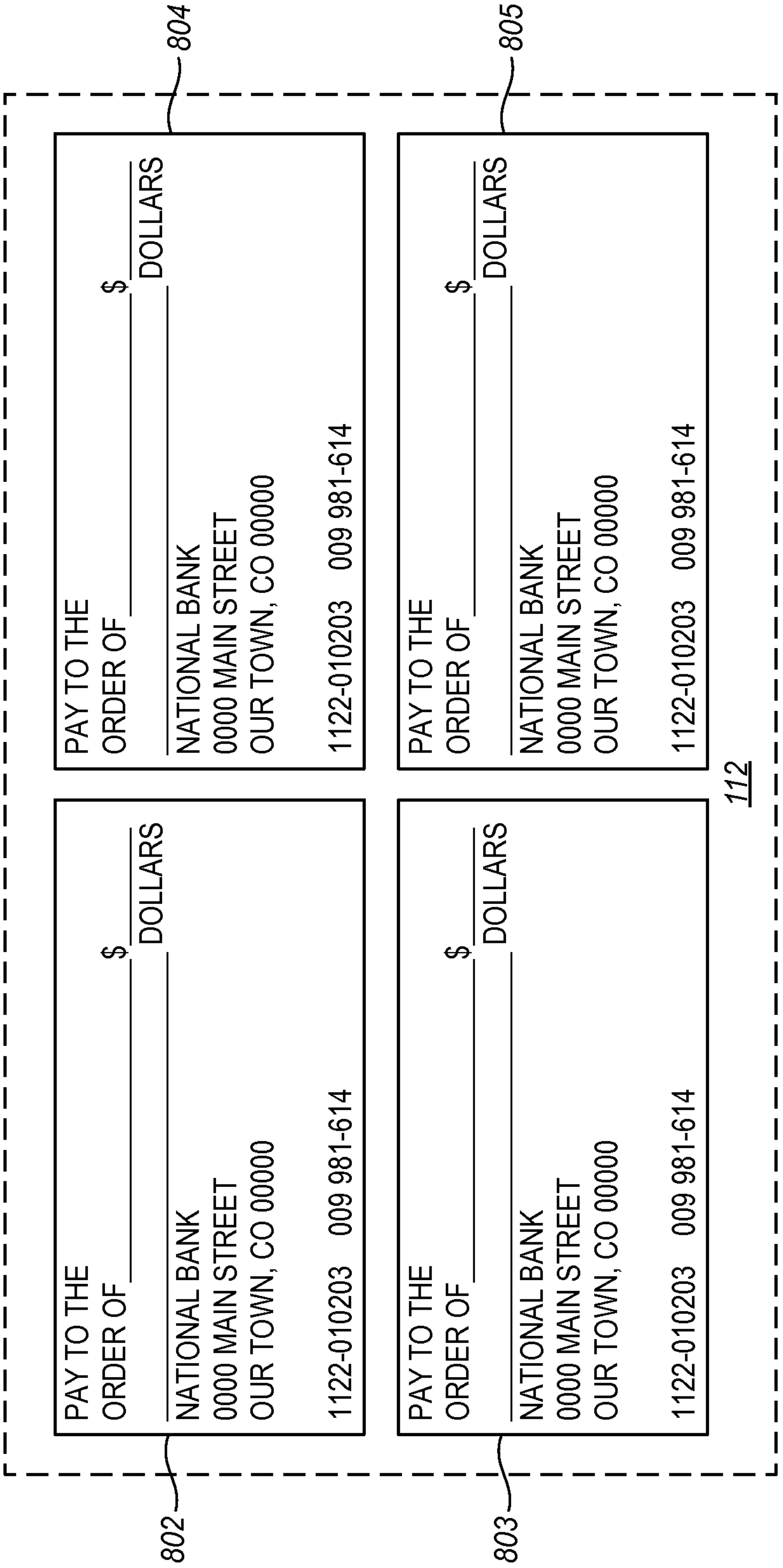
FIG. 8 illustrates pre-printed checks on a continuous form media in an exemplary embodiment.

FIG. 8 illustrates an example of pre-fed section 112 of media 116 which includes a number of sensitive elements for imprinting by printer 702. Specifically, FIG. 8 illustrates that section 112 includes checks 802-805. When media 116 includes checks 802-805, printer 702 may receive print data 110 that includes information for imprinting on one or more checks 802-805, such as payee information, check amount information, etc. For example, system 700 may perform a number of check printing operations, such as by generating government checks for a large number of payees.

Figure 9:
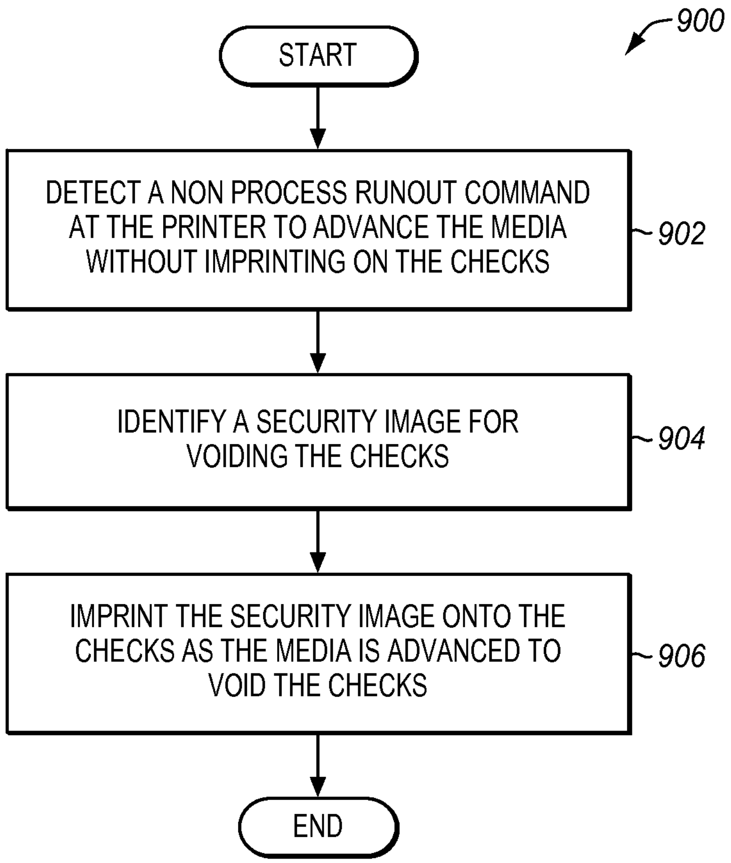
FIG. 9 is a flow chart illustrating a method of securely advancing check stock in response to detecting a non process run out command at a printer in an exemplary embodiment.

FIG. 9 is a flow chart illustrating a method 900 of securely advancing check stock in response to detecting a NPRO command in an exemplary embodiment. The steps of method 900 will be described with respect to system 700 of FIG. 7, although one skilled in the art will recognize that method 800 may be performed by other systems not shown.

In step 902, print controller 104 detects a NPRO command generated by user interface 704 for advancing media 116. Generating a NPRO command at printer 702 is potentially problematic as the NPRO command on a typical printer will advance media 116 without imprinting on checks 802-805.

In step 904, print controller 104 identifies security image 106 for voiding checks 802-805. As discussed previously, security image 106 may include graphical features, text, or a combination of graphical features and text for rendering checks 802-805 void after imprinting security image 106. For example, security image 106 may include readable text depicting “cancelled”, “void”, “non-negotiable”, or some other information clearly identifying that checks 802-805 as being invalid, null, having no legal or binding force, etc. Additionally, security image 106 may include, either alone or in combination with the aforesaid readable text, a pantograph, which is an image that is not visible in the original printed document, but which becomes visible in copies of the original document.

Figure 10:
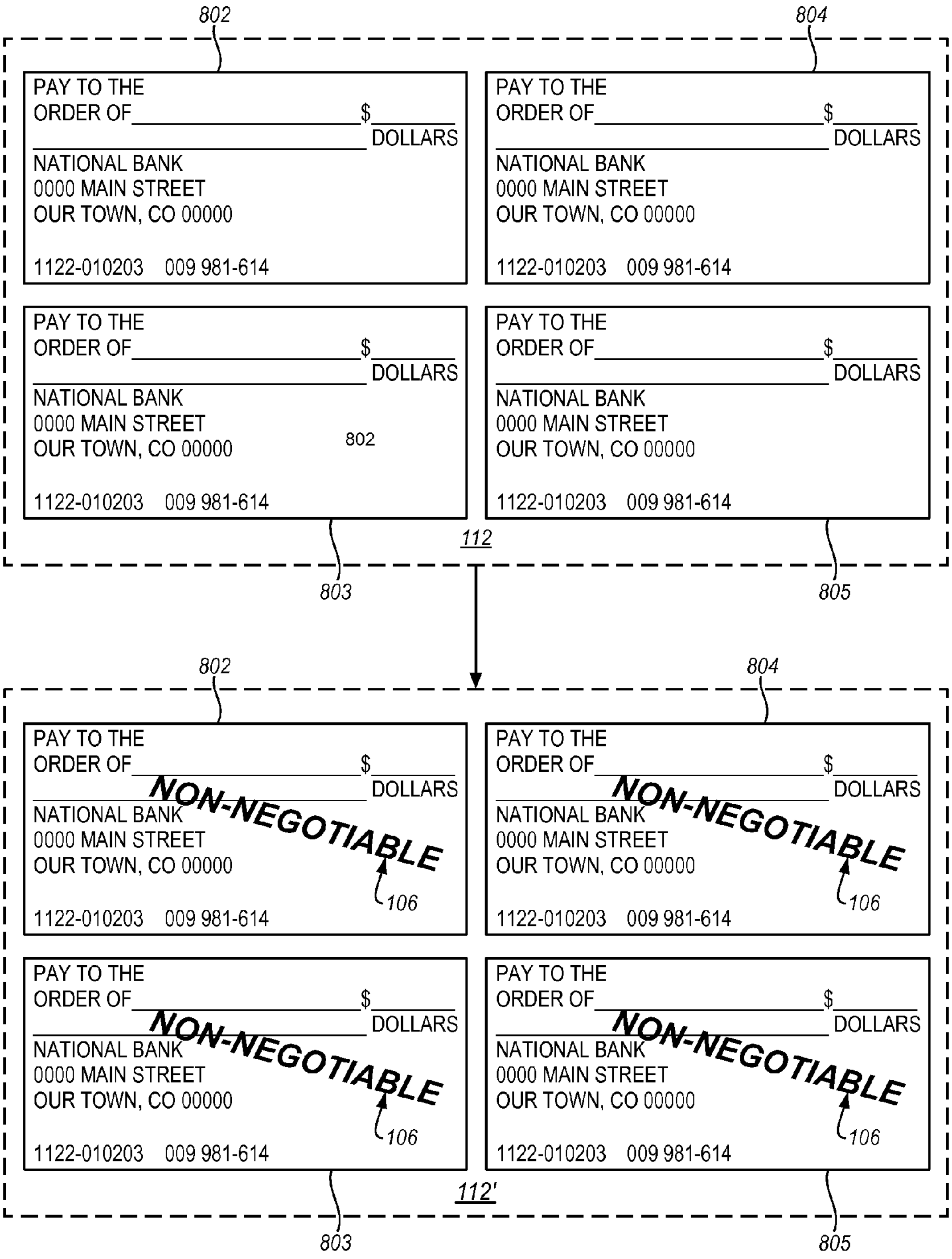
FIG. 10 illustrates the result of imprinting a security image onto the pre-printed checks of FIG. 8 in an exemplary embodiment.

In step 908, print controller 104 directs print engine 108 to imprint security image 106 onto checks 802-805 as media 116 is advanced. FIG. 10 illustrates the result of imprinting security image 106 onto pre-printed checks 802-805 of FIG. 8 in an exemplary embodiment.

Figure 11:
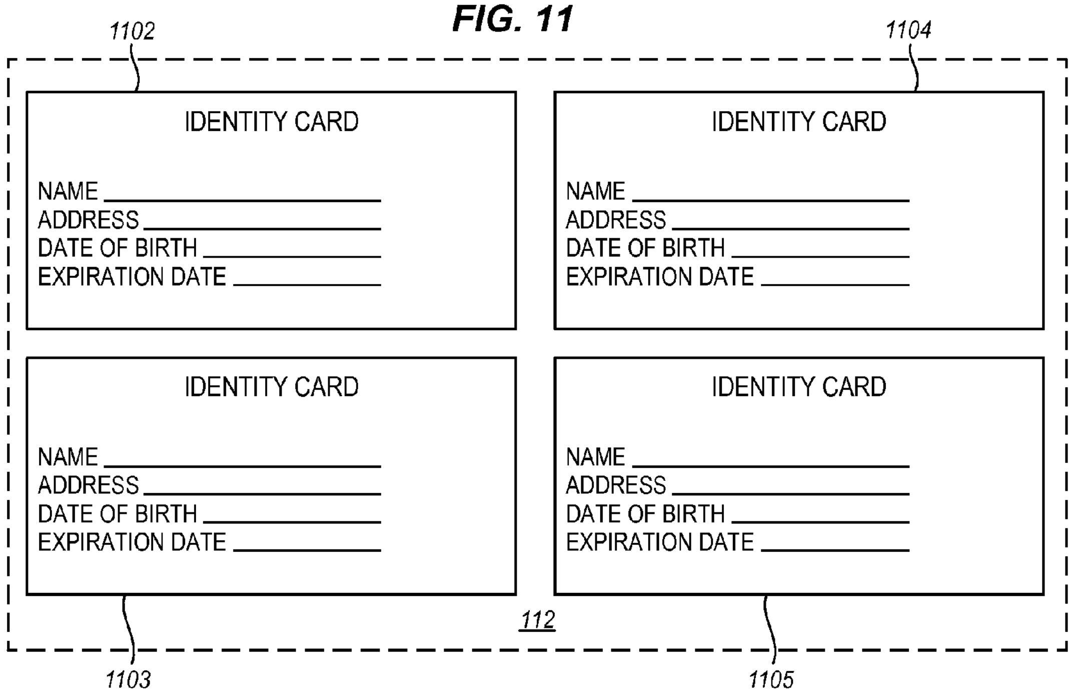
FIG. 11 illustrates pre-printed identification cards on a continuous form media in an exemplary embodiment.

FIG. 11 illustrates an example of pre-fed section 112 of media 116 which includes a number of sensitive elements for imprinting by printer 702. Specifically, FIG. 11 illustrates that section 112 includes identity cards 1102-1105. Identity cards 1102-1105 may include social security cards, driver's licenses, military identification cards, etc. When media 116 includes identity cards 1102-1105, printer 702 may receive print data 110 that includes information for imprinting on one or more identity cards 1102-1105, such as a name, an address, a date of birth, an expiration date for an identity card, etc. For example, system 700 may perform a number of identity card printing operations, such as by generating government identity cards.

Figure 12:
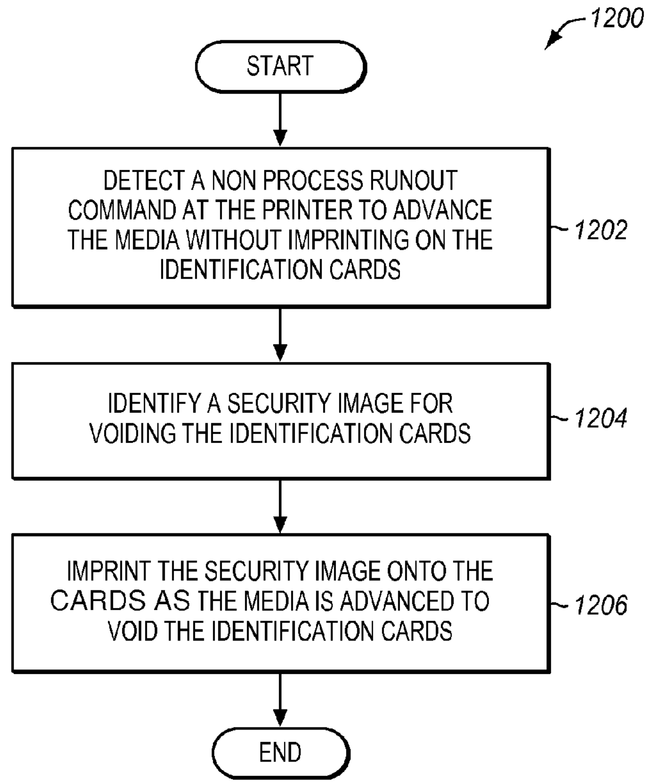
FIG. 12 is a flow chart illustrating a method of securely advancing identification card stock in response to detecting a non process run out command at a printer in an exemplary embodiment.

FIG. 12 is a flow chart illustrating a method 1200 of securely advancing identity card stock in response to detecting a NPRO command in an exemplary embodiment. The steps of method 1200 will be described with respect to system 700 of FIG. 7, although one skilled in the art will recognize that method 1200 may be performed by other systems not shown.

Figure 13:
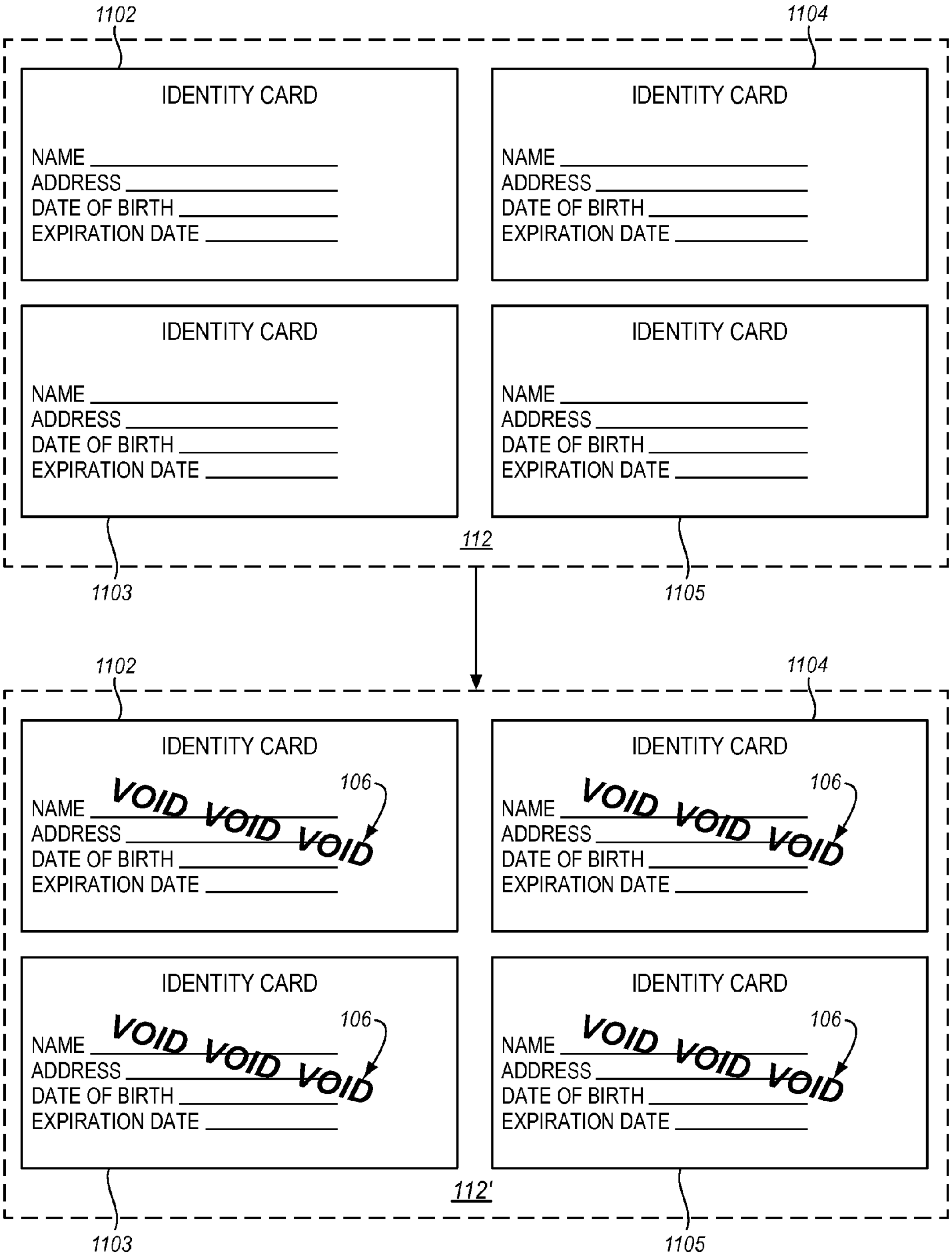
FIG. 13 illustrates the result of imprinting a security image onto the pre-printed identification cards of FIG. 11 in an exemplary embodiment.

In step 1202, print controller 104 detects a NPRO command generated by user interface 704 for advancing media 116. For example, the NPRO command may be generated to advance identity cards 1102-1105 of FIG. 11 through printer 702. In step 1204, print controller 104 identifies security image 106 for voiding identity cards 1102-1105 of FIG. 11. In step 1206, print controller 104 directs print engine 108 to imprint security image 106 onto identity cards 1102-1105 as media 116 is advanced. FIG. 13 illustrates the result of imprinting security image 106 onto pre-printed identity cards 1102-1105 in an exemplary embodiment.

Figure 14:
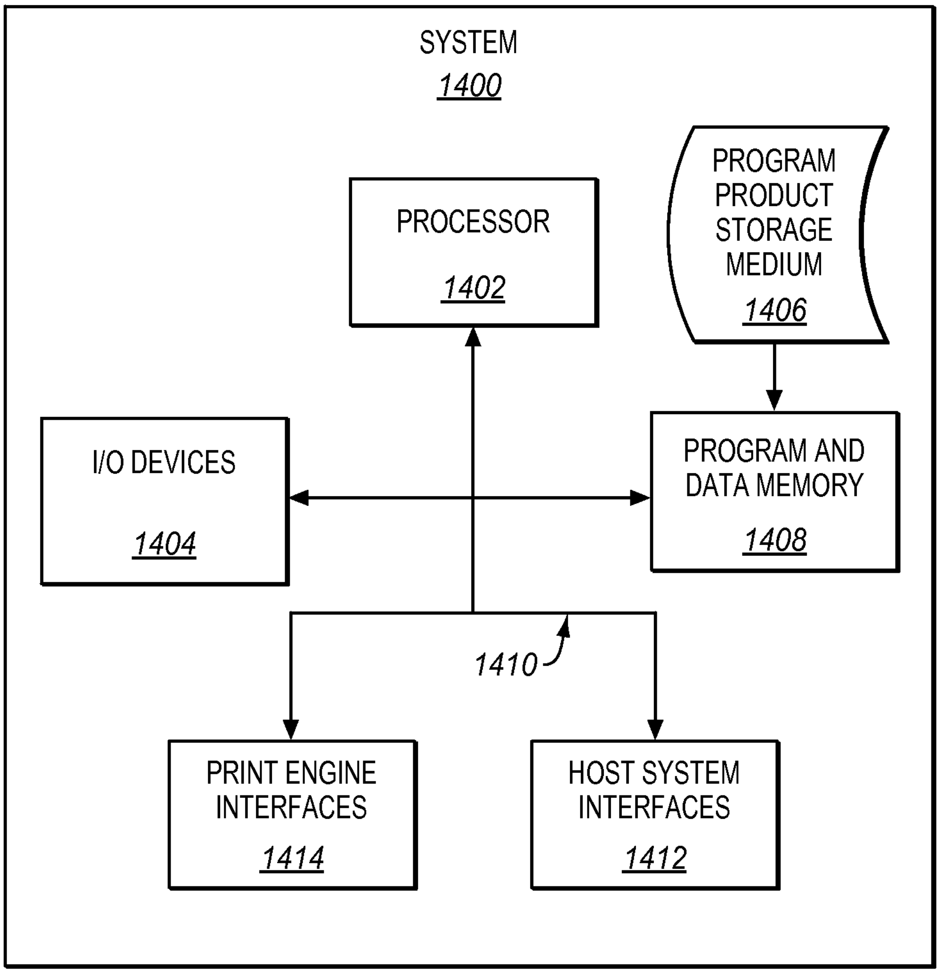
FIG. 14 illustrates a computer system operable to execute computer readable medium embodying programmed instructions to perform desired functions in an exemplary embodiment.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 14 illustrates system 1400 in which a computer readable medium 1406 may provide instructions for performing the methods disclosed herein.

Furthermore, the invention can take the form of a computer program product accessible from a computer-usable or computer-readable medium 1406 providing program code for use by or in connection with a computer or any instruction execution system. For the purposes of this description, a computer-usable or computer readable medium 1406 can be any apparatus that can contain, store, communicate, propagate, or transport the program for use by or in connection with the instruction execution system, apparatus, or device.

The medium 1406 can be an electronic, magnetic, optical, electromagnetic, infrared, or semiconductor system (or apparatus or device) or a propagation medium. Examples of a computer-readable medium 1406 include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor 1402 coupled directly or indirectly to memory elements 1408 through a system bus 1410. The memory elements 1408 can include local memory employed during actual execution of the program code, bulk storage, and cache memories which provide temporary storage of at least some program code in order to reduce the number of times code is retrieved from bulk storage during execution.

Input/output or I/O devices 1404 (including but not limited to keyboards, displays, pointing devices, etc.) can be coupled to the system either directly or through intervening I/O controllers.

Network adapters may also be coupled to the system to enable the data processing system to become coupled to other data processing systems, such as through host systems interfaces 1412, or remote printers or storage devices through intervening private or public networks, such as through print engine interfaces 1414. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

I claim:

1. A printer comprising:
- a print engine operable to print onto a continuous form media including pre-printed sensitive elements for imprinting; and
- a print controller operable to detect a command for advancing the media without imprinting on the sensitive elements, wherein the command is detected in response to receiving a blank logical page in a print job, to identify a security image for voiding the sensitive elements, and to direct the print engine to imprint the security image onto the sensitive elements as the media is advanced to void the sensitive elements.

2. The printer of claim 1 wherein the print controller is further operable to locate a sensitive element within the media to be advanced, and to direct the print engine to imprint the security image onto the located sensitive element.

3. The printer of claim 1 wherein the print controller is further operable to determine that the printer is loaded with a magnetic colorant, and to direct the print engine to imprint the security image in response to determining that the magnetic colorant is loaded.

4. The printer of claim 1 wherein the print controller is further operable to imprint the security image in response to receiving a Non Process Run Out (NPRO) command at the printer for advancing the media without imprinting on the sensitive elements.

5. The printer of claim 4 further comprising:
- a user interface operable to generate the NPRO command for advancing the media.

6. The printer of claim 1 wherein the security image includes text selected from "non-negotiable", "void", and "cancelled".

7. The printer of claim 1 wherein the sensitive elements are selected from an imprintable check and an imprintable identity card.

8. The printer of claim 7 wherein the imprintable identity card includes an imprintable government identification card.

9. A computer readable medium tangibly embodying programmed instructions which, when executed by a computing system, are operable for performing a method of securely advancing continuous form media including pre-printed sensitive elements for imprinting, the method comprising:
- detecting a command at a printer for advancing the media without imprinting on the sensitive elements;
- determining that the printer is loaded with a magnetic colorant;
- identifying a security image for voiding the sensitive elements; and imprinting the security image onto the sensitive elements as the media is advanced to void the sensitive elements in response to determining that the magnetic colorant is loaded.

10. A method operable on a printer using continuous form media, wherein the media includes pre-printed sensitive elements for imprinting, the method comprising:

detecting a command at the printer for advancing the media without imprinting on the sensitive elements, wherein the command is detected in response to receiving a blank logical page in a print job;

identifying a security image for voiding the sensitive elements; and imprinting the security image onto the sensitive elements as the media is advanced to void the sensitive elements.

11. The method of claim 10 further comprising:

locating a sensitive element within the media to be advanced, wherein imprinting further comprises:

imprinting the security image onto the located sensitive element.

12. The method of claim 10 wherein the security image includes text selected from "non-negotiable", "void", and "cancelled".

13. The method of claim 10 wherein detecting the command further comprises:

detecting a Non Process Run Out (NPRO) command at the printer for advancing the media without imprinting on the sensitive elements.

14. The method of claim 13 wherein the NPRO command is generated by a user interface on the printer.

15. The method of claim 10 further comprising:

determining that the printer is loaded with a magnetic colorant, wherein imprinting the security image is performed in response to determining that the magnetic colorant is loaded.

16. The method of claim 10 wherein the sensitive elements are selected from an imprintable check and an imprintable identity card.

17. The method of claim 16 wherein the imprintable identity card includes an imprintable government identification card.

18. A printer comprising:

a print engine operable to print onto a continuous form media including pre-printed sensitive elements for imprinting; and a print controller operable to detect a command for advancing the media without imprinting on the sensitive elements, to determine that the printer is loaded with a magnetic colorant, to identify a security image for voiding the sensitive element, and to direct the print engine to imprint the security image in response to determining that the magnetic colorant is loaded.

19. A computer readable medium tangibly embodying programmed instructions which, when executed by a computing system, are operable for performing a method of securely advancing continuous form media including pre-printed sensitive elements for imprinting, the method comprising:

detecting a command at a printer for advancing the media without imprinting on the sensitive elements wherein the command is detected in response to receiving a blank logical page in a print job;

identifying a security image for voiding the sensitive elements; and imprinting the security image onto the sensitive elements as the media is advanced to void the sensitive elements.

20. The computer readable medium of claim 19 further comprising:

locating a sensitive element within the media to be advanced, wherein imprinting further comprises:

imprinting the security image onto the located sensitive element.

21. The computer readable medium of claim 19 wherein the method further comprises:

determining that the printer is loaded with a magnetic colorant, wherein imprinting the security image is performed in response to determining that the magnetic colorant is loaded.

22. The computer readable medium of claim 19 wherein detecting the command further comprises:

detecting a Non Process Run Out (NPRO) command at the printer for advancing the media without imprinting on the sensitive elements.

23. The computer readable media of claim 22 wherein the NPRO command is generated by a user interface on the printer.

24. The computer readable medium of claim 19 wherein the sensitive elements are selected from an imprintable check and an imprintable identity card.

25. The computer readable medium of claim 24 wherein the imprintable identity card comprises an imprintable government identification card.

26. The computer readable medium of claim 19 wherein the security image includes text selected from "non-negotiable", "void", and "cancelled".

27. A printer comprising:

a print engine operable to print onto a continuous form media, wherein the media includes pre-printed identity cards for imprinting by the print engine;

a user interface operable to generate a Non Process Run Out (NPRO) command for advancing the media in response to input from a user; and a print controller operable to detect the NPRO command, to determine that the printer is loaded with a magnetic colorant, to identify a security image for voiding the identity cards, and to direct the print engine to imprint the security image onto the identity cards as the media is advanced to void the identity cards in response to determining that the magnetic colorant is loaded.

28. The printer of claim 27 wherein the print controller is further operable to locate an identity card within the media to be advanced, and to direct the print engine to imprint the security image onto the located identity card.

29. A printer comprising:

a print engine operable to print onto a continuous form media, wherein the media includes pre-printed checks for imprinting by the print engine;

a user interface operable to generate a Non Process Run Out (NPRO) command for advancing the media in response to input from a user; and a print controller operable to detect the NPRO command, to determine that the printer is loaded with a magnetic colorant, to identify a security image for voiding the checks, and to direct the print engine to imprint the security image onto the check as the media is advanced to void the checks in response to determining that the magnetic colorant is loaded.

30. The printer of claim 29 wherein the print controller is further operable to locate a check within the media to be advanced, and to direct the print engine to imprint the security image onto the located check.

31. A method operable on a printer using continuous form media, wherein the media includes pre-printed sensitive elements for imprinting, the method comprising:

detecting a command at the printer for advancing the media without imprinting on the sensitive elements;

determining that the printer is loaded with a magnetic colorant;

identifying a security image for voiding the sensitive elements; and imprinting the security image onto the sensitive elements as the media is advanced to void the sensitive elements in response to determining that the magnetic colorant is loaded.

* * * * *